United States Patent [19]

Childs

[11] 4,456,025

[45] Jun. 26, 1984

[54] REGULATOR FOR HIGH VOLUME AIR FLOW CONTROL

[76] Inventor: Willard D. Childs, 582 Rancho Santa Fe Rd., Encinitas, Calif. 92024

[21] Appl. No.: 335,081

[22] Filed: Dec. 28, 1981

[51] Int. Cl.³ ............................................. G05D 16/10
[52] U.S. Cl. ..................................... 137/115; 137/102; 137/528
[58] Field of Search ............... 137/115, 528, 529, 538, 137/102; 251/205

[56] References Cited

U.S. PATENT DOCUMENTS

| | | | |
|---|---|---|---|
| 2,574,414 | 8/1949 | Ragland | 137/528 |
| 2,984,251 | 5/1961 | Quinby | 137/116.3 |
| 3,636,969 | 1/1972 | Jacobellis | 137/528 |
| 3,774,628 | 11/1973 | Norton | 137/115 |
| 4,006,919 | 2/1977 | Neuman | 251/205 |
| 4,253,480 | 3/1981 | Kessel | 137/102 |

Primary Examiner—Martin P. Schwadron
Assistant Examiner—James R. Shay

[57] ABSTRACT

A regulator is provided for controlling air flow at high volume at either low vacuum or low pressure levels. The regulator includes an accumulator chamber having a first opening for providing flow of air from the accumulator chamber to a plenum and a second opening to facilitate air flow from either a positive pressure pump or a vacuum pump to the accumulator chamber. A regulator chamber is provided adjacent to the accumulator chamber for controlling pressure in the accumulator chamber, the two chambers being separated by a piston which moves in response to relative pressure changes in the chambers. This movement is controlled by means of a pressure transducer connected to the regulator chamber which controls air pressure to the regulator chamber through a valve by means of a comparison circuit which senses any difference between the pressure in the accumulator chamber and the desired pressure.

In the preferred embodiment, a manifold plate at one end of the accumulator chamber is provided with the required ports and a pair of plugs which can be removably placed in selected ports to change the regulator from a pressure regulator to a vacuum regulator and vice versa.

12 Claims, 12 Drawing Figures

REGULATOR FOR HIGH VOLUME AIR FLOW CONTROL

DESCRIPTION

1. Technical Field

This invention relates to a regulator for controlling high volume air flow at low vacuum or low pressure levels, and more particularly to a regulator that has particular aplication in connection with the conveying of newspaper jackets and newspaper inserts for placement in those jackets wherein flow of air at relatively high volumes through a plenum at low positive or negative pressure is required.

2. Background Art

After newspapers are printed, it is necessary that they be conveyed and manipulated in various ways prior to final stacking and shipment. For example, in commonly assigned U.S. patent application Ser. No. 262,042 filed May 11, 1981 for "Apparatus for Shingling Stack or Flat Articles" newspapers jackets are fed from a stack by means of a perforated belt having a vacuum plenum thereunder into a lap stream. The jackets are accelerated until they are separated for feeding past an inserter as shown in commonly assigned U.S. patent application Ser. No. 185,236 filed Sept. 8, 1980 for "Inserting System for Newspapers" by George A. Morin and Raymond H. Richardson, now abandoned. Inserts are fed from a stack by means of pressure and vacuum plenums onto a perforated endless belt which acts as an accelerator for the lowermost insert to shoot it into a passing jacket which has been opened to receive the insert.

Additional vacuum or pressure plenums can be used in the various manipulations of the jackets as will be apparent to one skilled in the art. For example, a pressure plenum may be used under the jackets as an aligning device to reduce the friction between the jacket and the belt supporting it. Also, an air plenum can be used in a jacket separating device for receiving the inserts.

A problem in providing the type of air regulation required for this purpose is that no regulators are available commercially which will regulate the flow of high volumes of air and low pressure with the preciseness required for this purpose. For example, U.S. Pat. No. 3,774,628 to Norton, et al. discloses a pressure regulator which has an arrangement which includes a supply chamber, a regulating chamber and a static chamber. A piston is connected to a diaphragm separating the static chamber and the regulating chamber and providing an air passage between the supply chamber and the regulating chamber. The invention does not reach the precise level of control required for newspaper handling as described above.

U.S. Pat. No. 2,984,251 to Quinby discloses a pressure regulator which uses an electrical transducer and comparator to control venting means for a pressure line. However, this apparatus is unsuitable for the type of pressures and controls required for handling newspapers.

DISCLOSURE OF THE INVENTION

In accordance with this invention, a regulator for controlling high volume air flow at low vacuum or low pressure levels is provided which has an accumulator chamber with a first opening to facilitate air flow between the accumulator chamber and a plenum and a second opening to facilitate air flow between the accumulator chamber and a pump for moving the air into or out of the accumulator chamber depending upon whether it is being used as a pressure regulator or a vacuum regulator. A regulator chamber is also provided for controlling pressure in the accumulator chamber. A piston is provided between the two chambers which moves in response to relative pressure changes between the chambers. A pressure transducer is connected to the regulator chamber and a source of pilot air pressure is connected to the regulator chamber through a normally open valve. A normally closed vent to atmosphere is also provided in the regulator chamber. A comparison circuit which is responsive to the pressure transducer to open either the air pressure source or the vent is provided to adjust the air pressure in the regulator chamber to a predetermined level to cause a responsive movement of the piston to make a corresponding adjustment of the pressure of the accumulator chamber from the actual pressure therein to the desired pressure.

More particularly the accumulator chamber includes a manifold plate at one end thereof which has a first port to provide for a vacuum to be pulled from the plenum to the accumulator or alternatively for air to be provided under pressure to the plenum. A second port is provided which is either connected to the air pressure pump or the vacuum pump. The third port is a vent to atmosphere for the vacuum mode and the fourth port is a vent to atmosphere for the pressure mode. Each of these ports is also in communication with the accumulator chamber. Two removeable plugs are provided, the first of which alternatively plugs the passageway from the vacuum port or the passageway from the air pressure relief port and the second of which plugs the air pressure relief port or alternatively plugs the vacuum port.

In the pressure mode, a sidewall of the piston selectively opens or closes a key-hole shaped slot to control the flow of air from the accumulator chamber to the pressure relief port. Movement of the piston is controlled by pilot air pressure to the side of the piston opposite the accumulator chamber, i.e., the pressure chamber through a normally open pilot pressure source valve. The operation of this valve is controlled by a pressure transducer connected in the pressure line which senses variations therein due to movement of the piston in response to changes of pressure in the accumulator chamber. A normally closed dump valve is also provided on the pressure chamber side of the piston is vented to atmosphere to relieve pressure, as required.

In the vacuum mode, the piston includes a stem or rod extending downwardly toward a central opening in the manifold plate which communicates with the accumulator chamber. This stem is connected to a valve seat which selectively opens or closes a valve at the opening to regulate flow of air from atmosphere to the accumulator chamber. Conveniently, a fifth port is provided in the manifold plate which vents the side of the piston opposite the pressure chamber to atmosphere to permit its free reciprocal movement in response to pressure conditions in the pressure chamber and the accumulator chamber.

Additional advantages of this invention will become apparent when taken in conjunction with the accompanying drawings.

DESCRIPTION OF THE PREFERRED EMBODIMENTS

Figure 1:
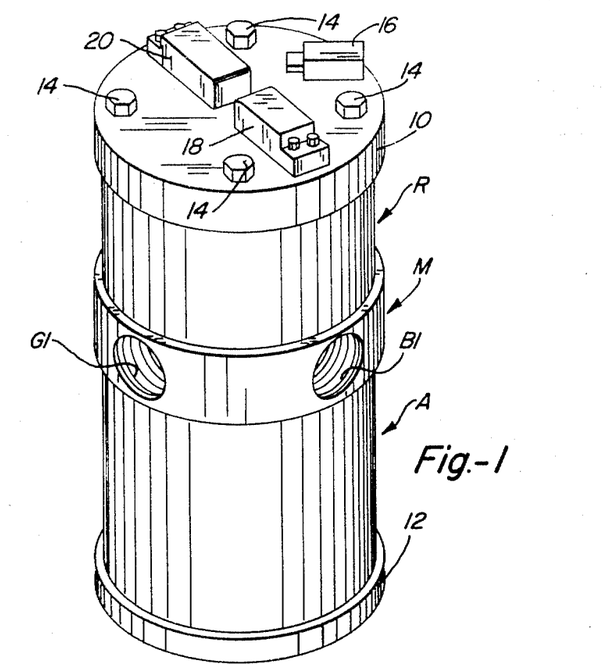
FIG. 1 is a side perspective view of a regulator constructed in accordance with this invention.
Figure 2:
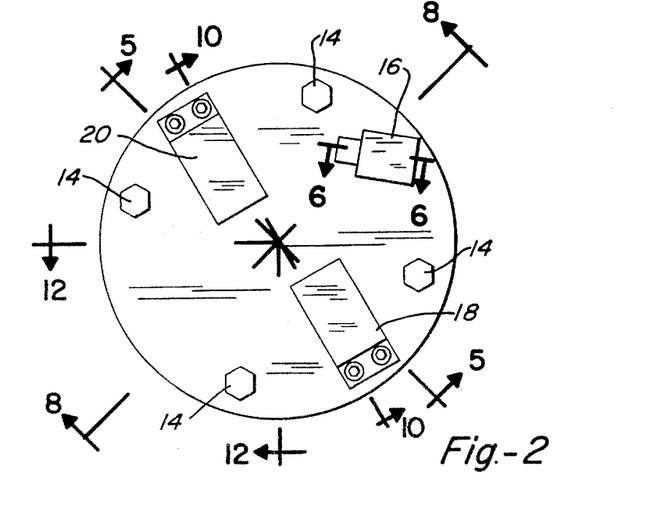
FIG. 2 is a top plan view of the regulator of FIG. 1.

In accordance with this invention, a regulator is provided as best shown in FIG. 1 which includes a regulator chamber R and an accumulator chamber A separated by a manifold plate M. A top plate 10 is joined to a bottom plate 12 by means of a plurality of spaced bolts 14. A pressure transducer 16 is mounted on top plate 10 along with a pilot pressure source valve 18 and a pilot pressure dump valve 20, for a purpose to be described.

Figure 3:
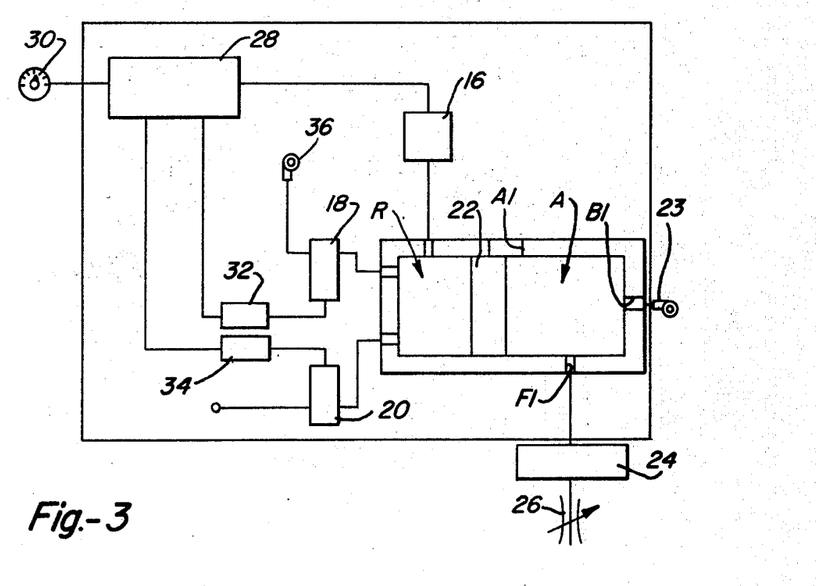
FIG. 3 is a diagramatic showing of the pneumatic circuitry used in conjunction with the regulator of this invention.
Figure 4:
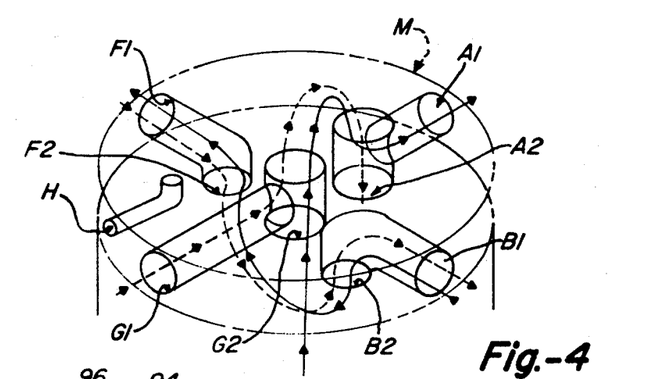
FIG. 4 is a diagramatic perspective view of the manifold plate which forms a part of the regulator of FIG. 1.

An overall view of the operation of this invention can be understood by a reference to FIG. 3. A regulator is shown having a regulator chamber R and an accumulator chamber A separated by a moveable piston 22. Air is supplied under pressure to accumulator chamber A by means of an air pump or compressor 23 through an inlet B1. Air under constant pressure can be supplied from accumulator chamber A through an outlet port F1 to a plenum 24 having variable size restrictions exemplified by control 26. Pressure within accumulator chamber A is controlled by movement of piston 22 in response to pilot air pressure in regulator chamber R. The piston also can vent air from accumulator chamber A to atmosphere through port A1 as required to keep the pressure constant within accumulator chamber A. Pressure transducer 16 senses the pilot air pressure in regulator chamber R and provides a signal indicative of that pressure to a comparison circuit 28. Comparison circuit 28 compares the signal from pressure transducer 16 with a signal from a pressure control 30. An output signal is provided by comparison circuit 28 to either solenoid 32 or solenoid 34. Pilot air pressure is supplied from an air pressure source such as compressor 36 through normally open pressure source valve 18 to regulator chamber R. If the pressure is too great in regulator chamber R then solenoid 32 will close valve 18. If necessary, air pressure in regulator chamber R can be relieved by activating solenoid 34 to open normally closed dump valve 20. If on the other hand, the pressure is too low in regulator chamber R solenoid 32 will maintain valve 18 in an open position so that compressor 36 can supply additional air to the regulator chamber R and solenoid 34 will maintain dump valve 20 in a closed position to prevent escape of air from the regulator chamber. Through this type of servo-mechanism, the air pressure can be regulated very precisely in accumulator chamber A, yet flow of air from the accumulator chamber can be at very high velocities. In this regard, the pressure can be regulated within 0.25 psi and 5.0 psi under volumes of between 20 and 25 cubic feet per minute.

Figure 5:
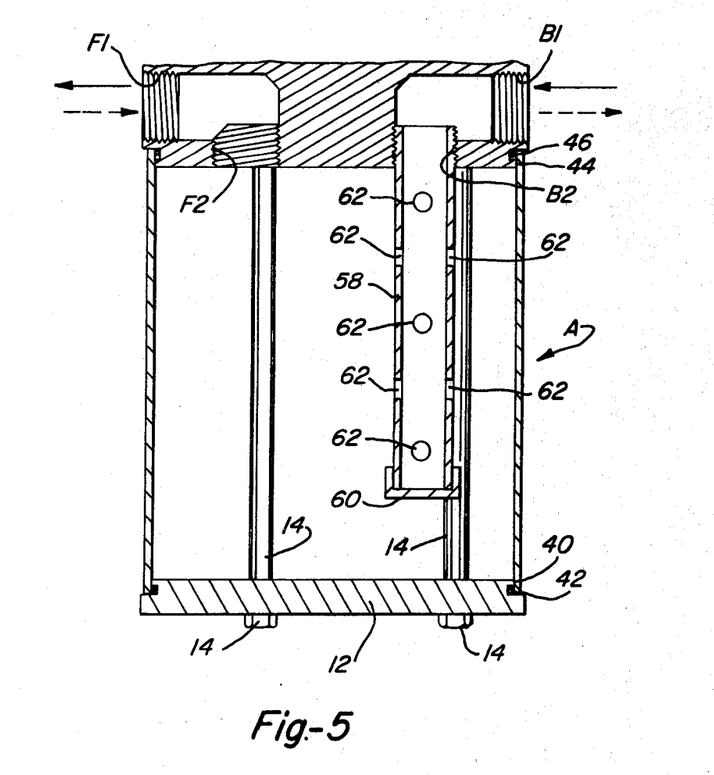
FIG. 5 is a slightly enlarged, vertical section, taken along the line 5—5 of FIG. 2, showing a portion of the inside of the accumulator chamber of the regulator of FIG. 1 when used as a pressure regulator.
Figure 6:
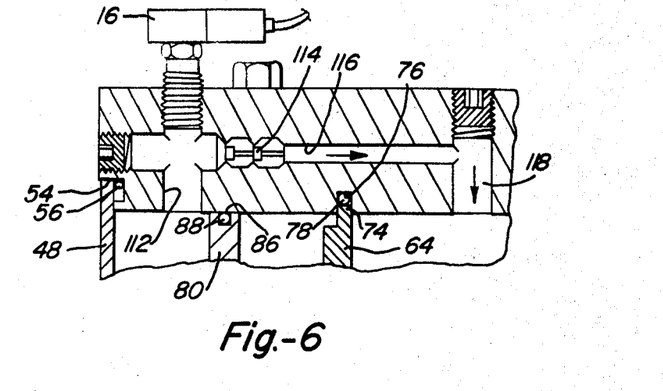
FIG. 6 is a fragmentary enlarged vertical section, taken along line 6—6 of FIG. 2, showing the pilot air pressure circuitry associated with the pressure transducer.
Figure 7:
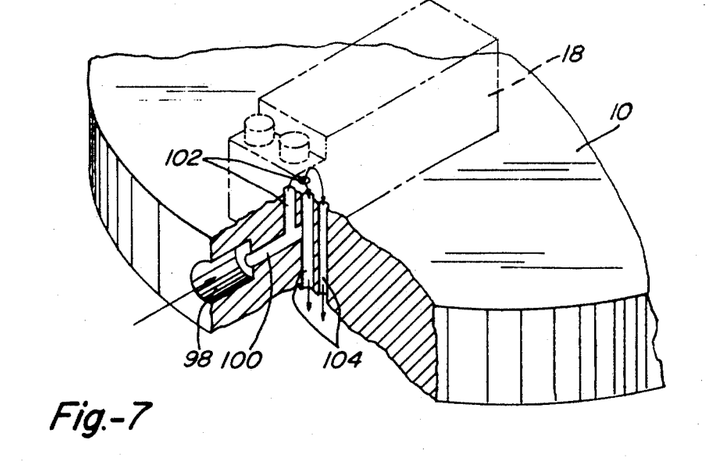
FIG. 7 is a diagramatic perspective view, with parts broken away, of the pilot air valve.
Figure 8:
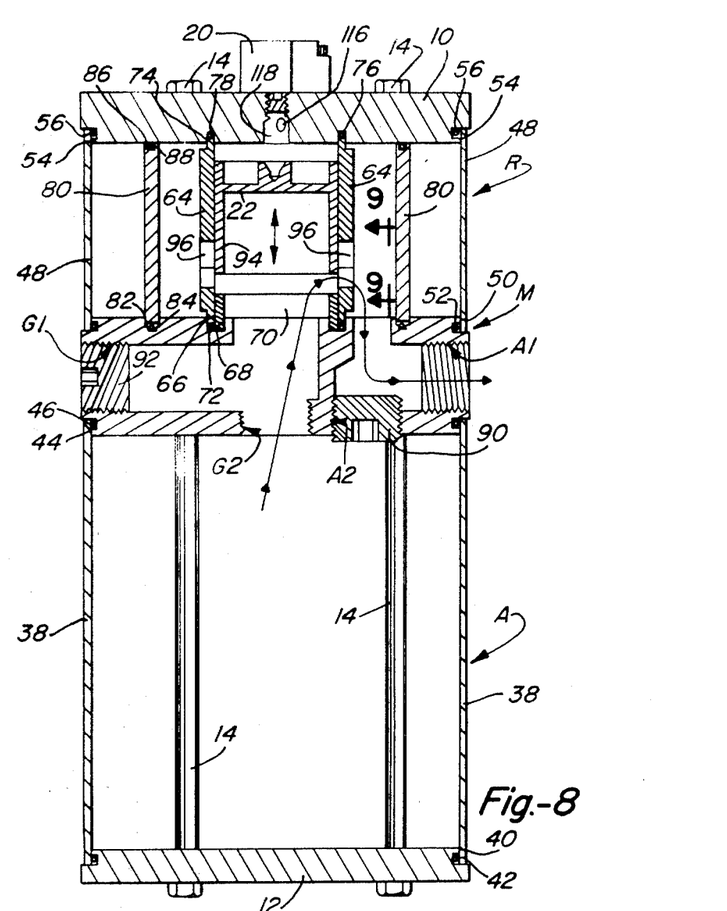
FIG. 8 is a slightly enlarged, vertical section, taken along line 8—8 of FIG. 2, showing further details of the accumulator chamber and the pressure chamber and piston arrangement of the regulator in the pressure mode.
Figure 9:
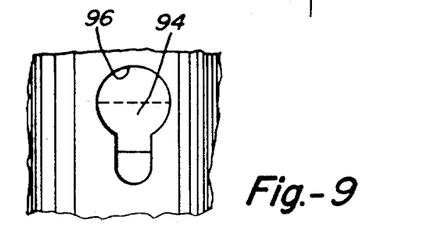
FIG. 9 is an enlarged, fragmentary, vertical section, taken along line 9—9 of FIG. 8, showing the exhaust valve controlled by the piston.

Now looking to FIGS. 4–10, the structure of the regulator will more clearly and fully be understood. As seen in FIGS. 5 and 8, the lower portion of the regulator includes a cylindrical sleeve 38 which serves as the sidewalls of accumulator A. One end of cylinder 38 frictionally engages the side edges of a lip 40 on bottom plate 12 and is sealed thereagainst by peripheral O-ring 42, as shown. The other end of cylinder 38 is frictionally engaged by the edge of lip 44 on manifold plate M and sealed thereagainst by a second O-ring 46. Similarly, as best seen in FIG. 8, the regulator chamber includes a cylindrical wall 48 having one end which frictionally engages the edge of a lip 50 on the manifold plate M and is sealed thereagainst as by O-ring 52. The opposite end frictionally engages the edge of lip 54 of top plate 10 and is sealed thereagainst by O-ring 56.

The flow of air from an air pressure source, such as compressor 23 of FIG. 3, is through port B1 in manifold plate M and down through port B2 into the accumulator. Conveniently, as seen in FIG. 5, a muffler tube assembly 58 has one end threadably received in opening B2 and has an end cap 60 at the opposite end. Muffler tube assembly 58 is provided with a plurality of openings 62 through which air is discharged in diverse directions into the accumulator. This air will remain under constant pressure as determined by the setting of pressure control 30 which will operate the servo-control mechanism as discussed above. The accumulator serves as a reservoir for a large amount of air under the desired pressure to accommodate surges in the need for air at the plenum. The connection to the plenum is through ports F2 and F1, also shown in FIG. 5.

Turning now to FIG. 8, it can be seen that piston 22 is mounted for reciprocal motion within piston cylinder 64. The piston cylinder 64 has a lip 66 at one end which is received in a circumferential recess 68 which also holds cylindrical piston stop 70. An O-ring seal 72 is also provided in the notch. The other end of sleeve 66 has a lip 74 received in a circumferential recess 76 in top plate 10 and is sealed therein by O-ring 78. Circumferentially surrounding piston cylinder 64 is a cylindrical sleeve 80 having one end positioned in a circumferential recess 82 in the top manifold plate M and provided with an O-ring 84. The opposite end of sleeve 80 has a recess 86 therein in which is positioned an O-ring 88 which provides a seal against the inner surface of top plate 10. Sleeve 80 is of substantially greater diameter than piston cylinder 64 and thus provides chambers within regulator chamber R for proper flow of pilot pressure air as will be apparent from the description which follows.

When the regulator is used as a pressure regulator, as shown in FIG. 8, opening A2 is closed, as by means of a threaded plug 90 and opening G1 is also closed by a threaded plug 92. If the pressure in accumulator Chamber A exceeds the predetermined level, the air pressure pushes upwardly on the bottom of piston 22 moving it toward upper plate 10. This causes the piston sidewall 94 to expose a portion of key-hole slots 96 shown in both FIG. 8 and FIG. 9 to permit escape of air from the accumulator chamber through opening A1 to atmosphere. Of course, when the pressure transducer causes pilot air to force piston 22 downwardly, the key-hole slots 96 will be closed. As will be apparent to one skilled in the art, the key-hole shape of the slots causes the rate at which air is dumped from accumulator chamber A to increase more rapidly, the greater the increases in pressure within the chamber.

Figure 10:
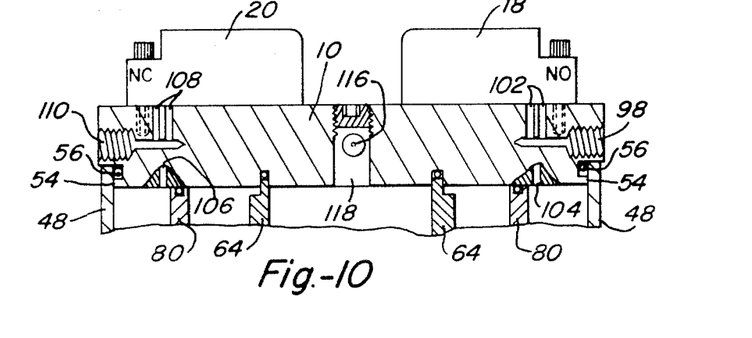
FIG. 10 is a fragmentary, enlarged, vertical section, taken along line 10—10 of FIG. 2, showing further details of the pilot pressure circuitry.

As best seen in FIGS. 7 and 10, pilot air pressure is supplied through an inlet 98 in top plate 10 by means of a passageway 100 and through a pair of vertical passageways 102 into pressure source valve 18. Since this valve is normally open, the pilot air pressure passes through the valve and down through a pair of vertical discharge passageways 104 into the area between cylinder 48 and sleeve 80. The flow through normally-closed dump valve 20 is in the opposite direction to allow discharge of air from this chamber. Looking at FIG. 10, it can be seen that if dump valve 20 is opened the air will pass from the space between cylinder 48 and sleeve 80 through vertical passageways 106 through the dump valve 20 and through passageways 108 to outlet 110 which is vented to atmosphere.

Pilot air pressure in the space between cylinder 48 and sleeve 80 is sensed by pressure transducer 16, as best seen in FIG. 6. The air flows through an inlet 112 to the pressure transducer and is metered through a metering valve 114 and then passes along passageway 116 to outlet 118 which provides air to the upper end of piston 22.

Figure 11:
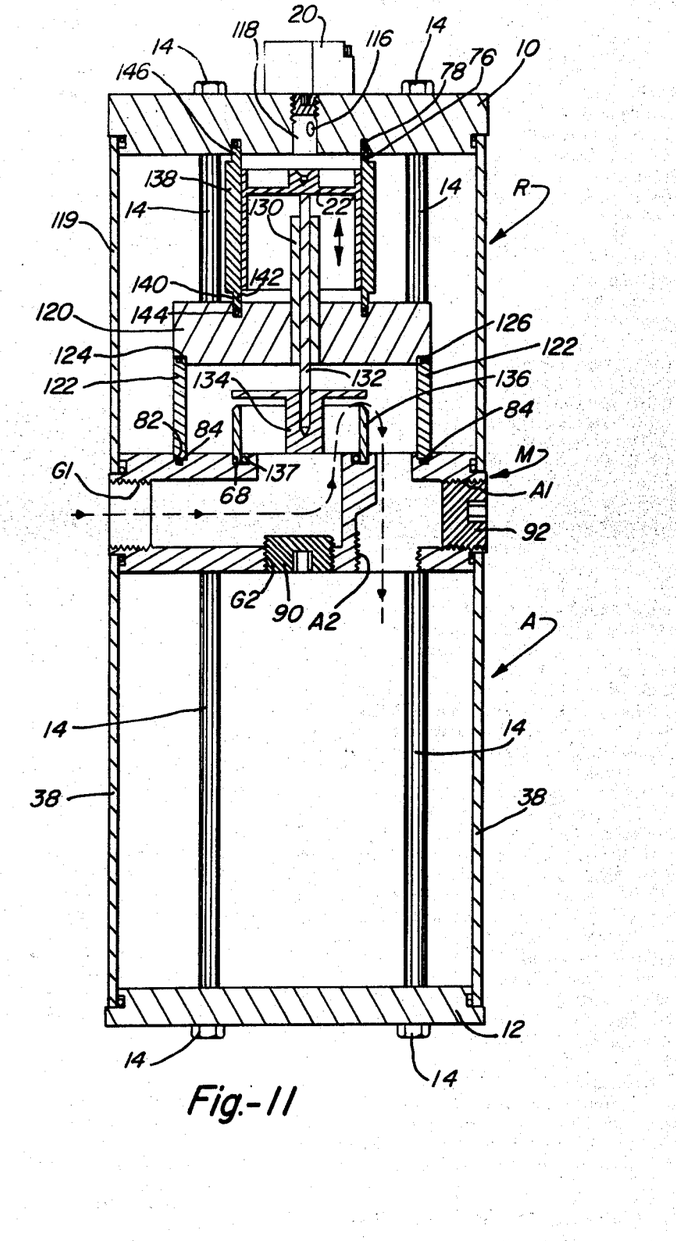
FIG. 11 is a vertical section, similar to FIG. 8, but showing details of the regulator in the vacuum regulator mode.
Figure 12:
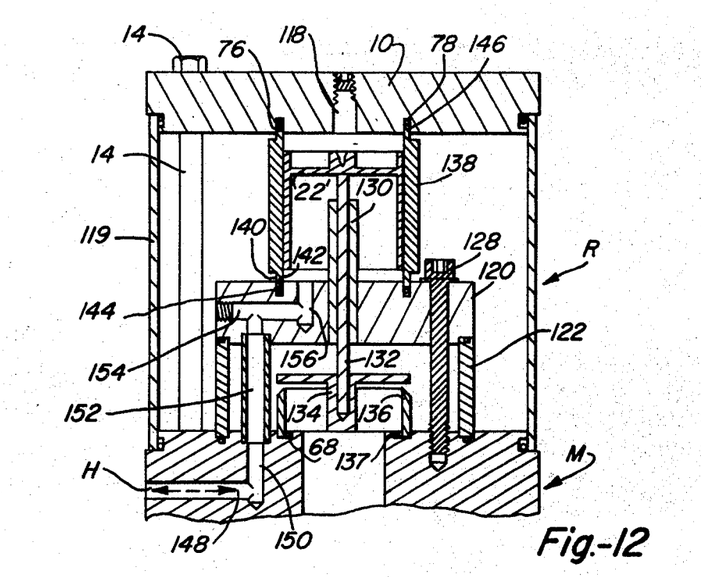
FIG. 12 is a fragmentary offset vertical section, taken along line 12—12 of FIG. 2, showing further details of piston arrangement in the vacuum regulator.

When the regulator is to be used as a vacuum regulator, it must be modified as shown in FIGS. 11 and 12. In this regard, a longer cylinder 119 is provided between manifold plate M and top plate 10 to provide more room for the additional ports associated with the piston, as will be described below. Also plug 90 is moved from opening A2 to opening G2 and plug 92 is moved from opening G1 to opening A1. A supporting plate 120 is mounted on a ring 122 whose lower end is received in recess 82 of manifold plate M and bears against O-ring 84. The top edge of ring 122 is received in lip 124 at the bottom of the supporting plate and has an O-ring 126 against which supporting plate 120 bears. The support plate is held in place by a plurality of spaced screws, such as screw 128, shown in FIG. 12. As seen, this screw extends through plate 120 into the top of manifold plate M. A guide sleeve 130 extends upwardly from the center of supporting plate 120 and serves as a guide for a rod 132 to which a valve 134 is connected. This rod and valve are moved in response to movement of piston 22' to which they are connected. The valve, wherein its lower position seats against valve seat 136. Conveniently, valve seat 136 is held in notch 68 by O-ring 137. A piston cylinder 138 has a lip 140 at one end which is received in a circumferential recess 142 in supporting plate 120 containing an O-ring 144 against which the end of the lip seats. The opposite end of piston cylinder 138 includes a lip 146 extending into recess 76 in top plate 10 and against an O-ring 78.

The lower side of piston 22' is vented to atmosphere through a series of passageways so that piston 22' can move in response to pilot air pressure from outlet 118. A port H is provided in the manifold plate M, which includes horizontal passageway 148 and vertical passageway 150 as shown in FIG. 12. Passageway 150 is connected by means of a tube 152 to a hoizontal passageway 154 in support plate 120 which in turn is connected to a vertical passageway 156 in communication with the lower side of piston 22'. Thus, if the vacuum in accumulator chamber A becomes too great, the piston 22' will move upwardly in response to the servo-mechanism, previously described, and raise valve 132 off of valve seat 136 allowing air from atmosphere to enter through port G1, traveling through the valve and down into the accumulator chamber through port A2, as shown by the arrows in FIG. 11. Likewise, if the vacuum in accumulator chamber A becomes too little, the servo-mechanism will cause piston 22' to be forced downwardly by pilot air pressure from outlet 118 so as to cause valve 134 to seat against valve 136 so that no more air can enter accumulator chamber A from atmosphere. Of course, the vacuum pump which is connected to port B1 will continue to pull a vacuum in the accumulator chamber.

From the foregoing, the advantages of this invention are readily apparent. A regulator has been provided, which, with slight modification, can be used either as a pressure regulator or a vacuum regulator. The regulator permits very precise control of low positive or negative pressures with the air flowing at high volume. A pilot air pressure source is provided to one side of a piston. The pressure against the piston is sensed by a pressure transducer and compared with a desired pressure setting so that through a servo-mechanism the pilot air pressure can be modified to control the air pressure within the accumulator chamber.

The invention has been described in detail with particular reference to particular embodiments thereof, but it will be understood that variations and modifications can be affected within the spirit and scope of this invention.

What is claimed is:

1. A pressure regulator for controlling high volume air flow at low pressure levels, said regulator comprising:
   a first cylinder;
   a top plate covering one end of said first cylinder and including a passageway for supplying pilot air pressure within said cylinder;
   a pressure transducer connected to said passageway to sense the pilot pressure;
   a manifold plate closing the other end of said first cylinder to form a regulator chamber within said first cylinder;
   a piston cylinder centrally mounted in said first chamber, said passageway communicating with the top of said piston cylinder;
   a piston reciprocally mounted within said piston cylinder;
   a second cylinder having one end connected to the opposite side of said pressure manifold;
   a bottom plate enclosing the opposite end of said second cylinder to form an accumulator chamber within said second cylinder;
   fastening means connecting said top plate to said first cylinder and said bottom plate to said second cylinder with said manifold plate between said cylinders;

at least one opening in said cylinder wall which is selectively opened and closed by movement of said piston;

a first port means in said manifold plate extending from said accumulator chamber to the peripheral edge of said manifold plate for connection to a plenum;

a second port means in said manifold plate extending from said accumulator chamber to the periphery of said manifold plate opposite said port from said first port means and connectable to a pressure pump;

a central opening aligned with said piston cylinder extending through said manifold plate centrally thereof, to permit flow of air in said accumulator chamber into said piston cylinder on the side of said piston opposite the pilot air pressure; and a third port means in said manifold plate extending from said opening in said cylinder wall to the peripheral edge of said manifold plate to vent said accumulator chamber to atmosphere when said piston moves to a position to open at least a portion of said opening in said piston cylinder wall.

2. A pressure regulator, as claimed in claim 1, further including:
a fourth port means in said manifold plate extending from said central opening to the peripheral wall of said manifold plate and having a first plug therein; and a port in said third port means into said accumulator chamber having a second plug therein.

3. A pressure regulator, as claimed in claim 1, wherein:
said central opening includes piston stop means within said piston cylinder for limiting movement of said piston cylinder toward said accumulator chamber.

4. A pressure regulator, as claimed in claim 1, wherein;
said opening in said piston cylinder wall has a key-hole configuration wherein the larger portion of said key-hole extends toward said piston so that the open area of said opening increases rapidly as said piston moves away from said accumulator chamber.

5. A pressure regulator, as claimed in claim 1, wherein said fastening means includes:
a plurality of circumferentially spaced bolts extending longitudinally through said top plate, said manifold plate and said bottom plate to hold the regulator in assembled condition.

6. A pressure regulator, as claimed in claim 1, wherein said regulator chamber includes:
a sleeve concentrically mounted around said piston cylinder wall and within said first cylinder wall to form a first air chamber between said sleeve and said piston cylinder wall for directing flow of air from said accumulator chamber to atmosphere through said third port means, and a second chamber formed between said sleeve and said first cylinder wall to form a second chamber for flow from a source of pilot air pressure to the side of said piston opposite said accumulator chamber.

7. A pressure regulator, as claimed in 6, further including:
a pilot pressure inlet in the peripheral edge of said top plate;

a pressure source valve in fluid communication with said pilot pressure inlet and with said second chamber to control flow of pilot pressure air into said second chamber; and solenoid means connected between said pressure transducer and said pressure source valve to open and close said pressure source valve in response to a signal from said pressure transducer.

8. A pressure regulator, as claimed in claim 7, further including:
a pressure release port in the periphery of said top plate;

a normally closed dump valve in fluid communication with said vent port and said second chamber; and solenoid means connected to said dump valve and responsive to a signal from said pressure transducer to open said dump valve when said pilot pressure on said piston exceeds a predetermined limit.

9. A pressure regulator, as claimed in claim 1, further including:
a muffler extending from said second port means into said accumulator.

10. A pressure regulator, as claimed in claim 9, wherein said muffler includes:
a tubular body extending from said port means into said accumulator, a plurality of spaced openings around said tubular body and an end cap on the opposite end of said tubular body.

11. A vacuum regulator for controlling high volume air flow at low vacuum pressure levels, said regulator comprising:
a first cylinder;

a top plate covering one end of said first cylinder and including a passageway for supplying pilot air pressure within said cylinder;

a pressure transducer connected to said passageway to sense the pilot pressure;

a manifold plate closing the other end of said first cylinder to form a regulator chamber within said first cylinder;

a piston cylinder centrally mounted in said first chamber, said passageway communicating with the top of said piston cylinder;

a piston reciprocally mounted within said piston cylinder;

a second cylinder having one end connected to the opposite side of said pressure manifold;

a bottom plate enclosing the opposite end of said second cylinder to form an accumulator chamber within said second cylinder;

fastening means connecting said top plate to said first cylinder and said bottom plate to said second cylinder with said manifold plate between said cylinders;

a first port means in said manifold plate extending from said accumulator chamber to the peripheral edge of said manifold plate for connection to a plenum;

a second port means in said manifold plate extending from said accumulator chamber to the periphery of said manifold plate opposite said port from said first port means and connectable to a pressure pump;

a central opening aligned with said piston cylinder extending through said manifold plate centrally thereof, to permit flow of air in said accumulator chamber into said piston cylinder on the side of said piston opposite the pilot air pressure;

a third port means in said manifold plate extending from said opening in said cylinder wall to the peripheral edge of said manifold plate to vent said accumulator chamber to atmosphere when said piston moves to a position to open at least a portion of said opening in said piston cylinder wall;

a fourth port means in said manifold plate extending from said central opening to the peripheral wall of said manifold plate;

a support plate in said regulator chamber;

a ring supporting said supporting plate above said manifold plate;

a guide sleeve extending through said support plate and into said piston cylinder;

a rod having one end connected to said piston and extending through said guide sleeve into a space between said ring, said support plate and said manifold plate;

a valve connected to the opposite end of said rod;

a valve seat positioned over said central opening through said manifold plate against which said valve can close;

a first plug in said central opening between said accumulator chamber and said fourth port means; and a second plug in said third port means at the periphery of said manifold plate so that said accumulator chamber is vented to atmosphere when said valve in response to upward movement of said piston so that opens air from atmosphere passes through said fourth port means and said valve and through said third port means into said accumulator chamber.

12. A vacuum regulator, as claimed in claim 11, further including;

a fifth port means in said manifold plate vented to atmosphere;

a passageway in said support plate extending from the space formed by said support plate, said ring and said manifold plate to said piston cylinder; and a tube interconnecting said fifth port means and said passageway and said support plate to vent the side of said piston cylinder opposite said pilot pressure side to atmosphere to permit free movement of said piston in response to said pilot air pressure.

* * * * *